E. B. CEDERSTROM.
METHOD OF PREVENTING RUBBER TREATED FABRIC FROM STICKING TO THE LINER STRIP.
APPLICATION FILED APR. 21, 1915.

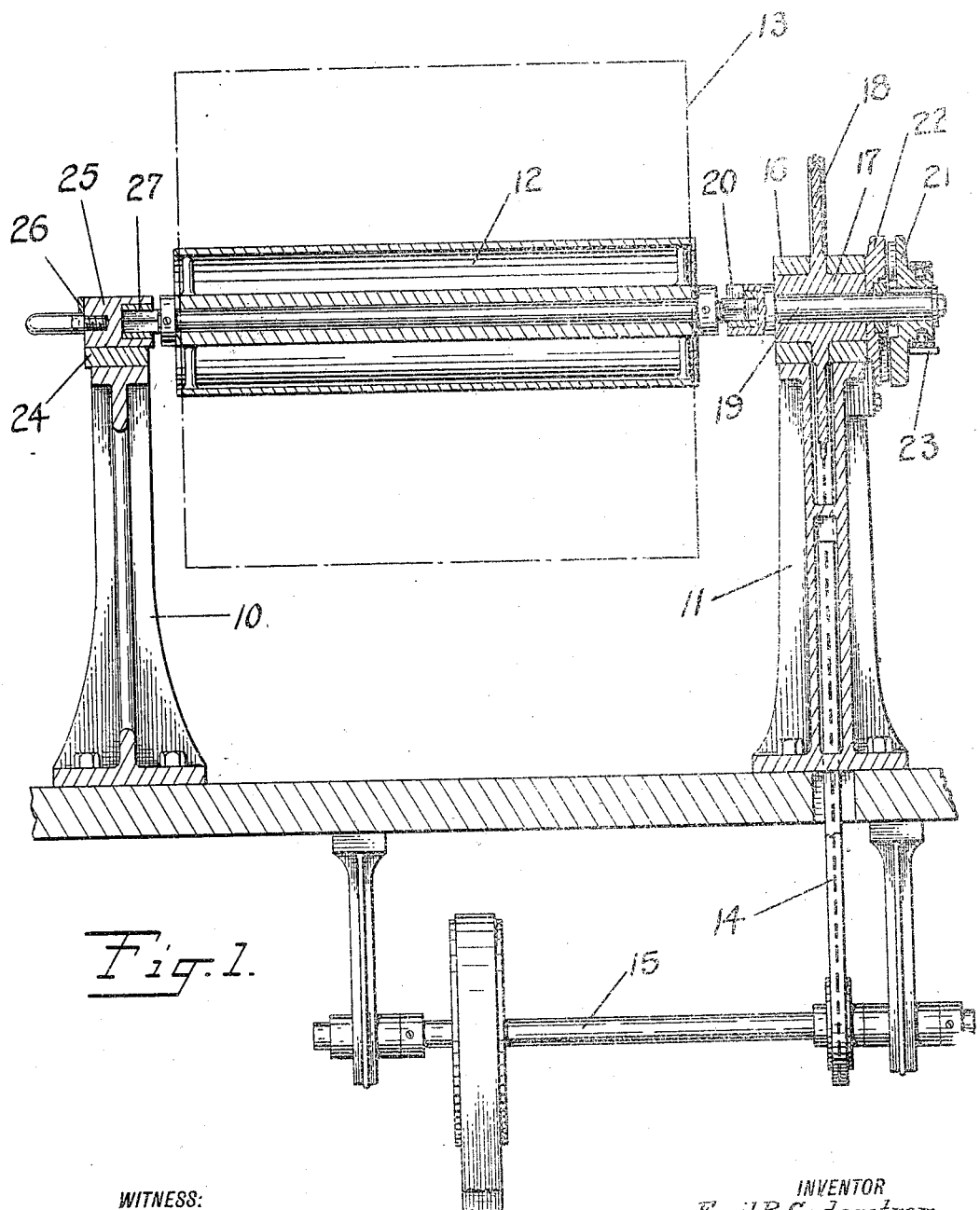

1,237,471.

Patented Aug. 21, 1917.
2 SHEETS—SHEET 2.

WITNESS:
S. G. Taylor.

INVENTOR
Emil B. Cederstrom.
BY
Ernest Hopkinson
HIS ATTORNEY

UNITED STATES PATENT OFFICE.

EMIL B. CEDERSTROM, OF DETROIT, MICHIGAN, ASSIGNOR TO MORGAN & WRIGHT, A CORPORATION OF MICHIGAN.

METHOD OF PREVENTING RUBBER-TREATED FABRIC FROM STICKING TO THE LINER-STRIP.

1,237,471.

Specification of Letters Patent.

Patented Aug. 21, 1917.

Application filed April 21, 1915. Serial No. 22,838.

*To all whom it may concern:*

Be it known that I, EMIL B. CEDERSTROM, a citizen of the United States, residing at Detroit, county of Wayne, State of Michigan, have invented certain new and useful Improvements in Methods of Preventing Rubber-Treated Fabric from Sticking to the Liner-Strip, of which the following is a full, clear, and exact description.

This invention relates to methods of treating fabric, more particularly fabric which carries a coat of unvulcanized rubber.

Rubber in its green or raw state, being mobile, is easily distorted. When green rubber is applied to fabric such as canvas, it is applied in a slightly warm condition which enhances distortion of the rubber under excessive stress. Thus when fabric, newly treated with rubber, is rolled upon a spindle and then left standing while cooling, it has been found that the weight of the roll causes the fabric to sag with consequent forcing away of the rubber in places, piling it up excessively in other places, and in many places causing it to adhere tightly to the fabric liner strip which is interpolated between the convolutions of the rubber treated fabric to keep them from sticking together.

Therefore, it is an object of the present invention to obviate this rubber distortion and sticking together of the rubber and liner strip while the roll is cooling. To attain this end I cause the roll of fabric to be kept in constant rotation on its axis while cooling, whereby the convolutions of rubber coated fabric are thrown out from each other constantly, so that the deleterious pressure hitherto existing in hanging or standing rolls of fabric with the attendant distortion of the mobile green rubber and sticking together of the rubber and liner strip is positively obviated.

A suitable apparatus for carrying out the invention is shown in the accompanying drawing, in which—

Figure 1 is a longitudinal sectional view through the apparatus;

Figure 3:
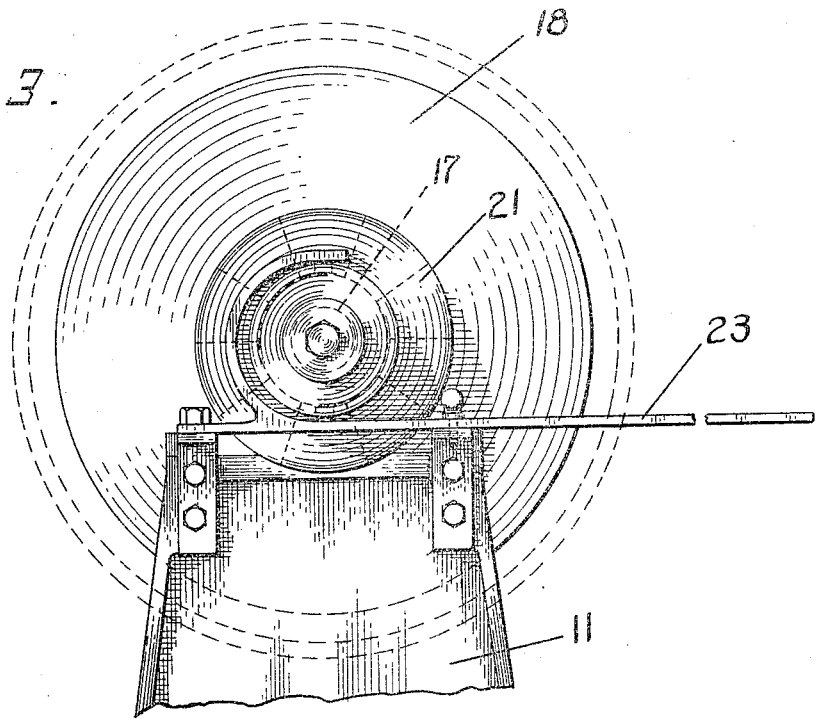
Fig. 3 is a fragmentary end elevation of the other support.
Figure 2:
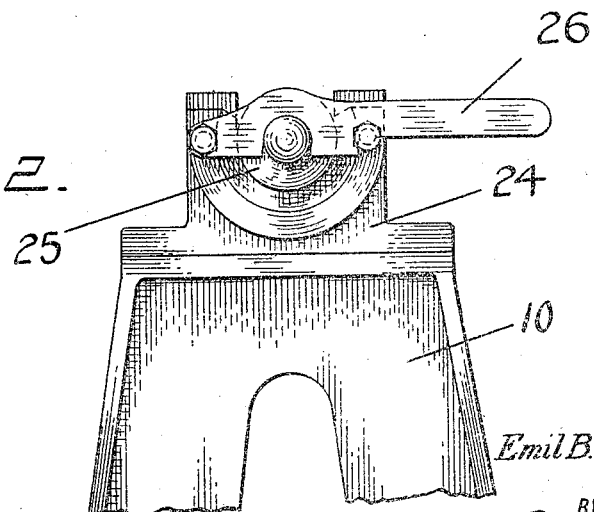
Fig. 2 is a fragmentary end elevation of one of the supports.

Briefly, the apparatus is shown to comprise a pair of supports 10 and 11 whereon the spindle 12 of a roll 13 of rubber-treated fabric may be rotatably suspended. Said roll is adapted to be continuously rotated on its axis by a chain drive 14, or otherwise, from a main drive shaft 15, the drive shaft being operatively connected to any suitable source of power (not shown). The apparatus is installed in a store-room, shop, or other desirable place where the fabric may be subjected to room temperature, that is atmospheric temperature.

More specifically, the standard 11 carries a bearing 16 in which is journaled the hub 17 of a sprocket 18, the hub being loose on a stub shaft 19 which is equipped on one end with an angular socket 20 to receive the spindle 12 of the fabric roll. Upon the other end of this shaft is feathered a clutch member 21 which coacts with a mating clutch member 22 integral with the hub 17 to lock the shaft for rotation with the sprocket. A lever 23 forms means for operating the clutch. The sprocket is continuously driven from the main drive shaft 15 and normally idles on the shaft 19, until coupled to the latter by throwing in of the clutch members, whereby the roll of fabric is rotated on its axis.

The standard 10 carries a bearing 24 which is open at the top to permit of the insertion and removal of a stub shaft 25 which is normally locked rotatably in the bearing by a hinged latch 26. The shaft 25 has a socket 27 to receive the corresponding end of the spindle 12 of the roll of fabric.

To remove a roll of fabric from the apparatus, it is simply necessary to throw out the clutch member 21, connect a suitable hoisting apparatus to the spindle of the fabric roll, open the latch 26, and then operate the hoisting apparatus sufficiently to lift the roll and enable the same to be removed from the socket 20 in the standard 11, whereupon the shaft 25 is removed from the end of the fabric spindle or reel and replaced on its standard 10. To apply a roll, the above operation is reversed.

Although I have shown a particular apparatus for carrying out my improved process of hanging and aging rubber treated fabric, I do not limit myself to the construction shown as any particular apparatus may be employed that will facilitate a roll of rubber treated fabric being suspended and rotated constantly on its axis during cooling.

What is claimed is:

1. A method of the kind described which comprises rotating a roll of rubber treated fabric and subjecting it to cooling.

2. A method of the kind described which comprises suspending a roll of rubber treated fabric rotating the roll and subjecting it to cooling.

3. A method of hanging and aging a roll of rubber treated fabric, consisting of suspending and rotating the roll upon its axis while subjecting it to atmospheric temperature.

Signed at Detroit, Mich., April 14th, 1915.

EMIL B. CEDERSTROM.